United States Patent [19]

Oldendorf et al.

[11] Patent Number: 4,650,014

[45] Date of Patent: Mar. 17, 1987

[54] ELECTRONIC BALANCE WITH DIGITAL AND ANALOG DISPLAY

[75] Inventors: Christian Oldendorf, Göttingen; Franz-Josef Melcher, Hardegsen; Erich Knothe, Eddigehausen, all of Fed. Rep. of Germany

[73] Assignee: Sartorius GmbH, Fed. Rep. of Germany

[21] Appl. No.: 808,485

[22] Filed: Dec. 13, 1985

[30] Foreign Application Priority Data

Dec. 21, 1984 [DE] Fed. Rep. of Germany ... 8437445[U]
Dec. 21, 1984 [DE] Fed. Rep. of Germany ....... 3446739

[51] Int. Cl.$^4$ ...................... G01G 23/30; G01D 13/22
[52] U.S. Cl. .............................. 177/177; 177/DIG. 3; 116/300; 116/DIG. 32
[58] Field of Search ................. 177/177, DIG. 3, 178; 116/300, DIG. 32

[56] References Cited

U.S. PATENT DOCUMENTS 4,076,088 2/1978 Gallo et al. ..................... 177/177 X
4,542,799 9/1985 Komoto ............................ 177/177

Primary Examiner—George H. Miller, Jr.
Attorney, Agent, or Firm—Eric P. Schellin

[57] ABSTRACT

The invention discloses an electronic balance comprising a measured value receiver (23) and an electronic evaluation unit (14) having a digital display (10) and an analog display (6), whereby both displays are controlled by the electronic evaluation unit (14). A digital input keyboard (12) is used for inputting the set weight value of a loading. The electronic evaluation unit (14) contains a memory (15) and an arithmetic unit (16) which permit the values indicated in the digital display (10) and in the analog display (6) to be differentiated against each other by the amount stored in the memory (15) so that during a loading procedure the digital display (10) runs from the negative set weight value to 0g and the analog display (6) from 0% to 100%. The analog display (6) consists of adjacent bars (7) which can be shited in their lightness, whereby the length of the individual bars continuously decreases from 0% to 100% of the set weight value, and continuously increases again over 100% of the set weight value.

11 Claims, 9 Drawing Figures

ELECTRONIC BALANCE WITH DIGITAL AND ANALOG DISPLAY

BACKGROUND OF THE INVENTION

1. Field of the Invention:

The invention is related to an electronic balance with a measured value receiver, and an electronic evaluation unit. A digital and an analog display are both controlled by the electronic evaluation unit, and by a digital input keyboard, for inputting a set weight of a loading.

2. Description of the Prior Art:

In the known balances of this type the digital and the analog displays always run synchronously. During loading, for example, both displays start at zero and rise during the loading to the set weight. The sole difference between the digital and the analog display is the fact that the digital display displays in grams while the analog display displays in percent (control value corresponds to 100%).

In addition, the analog display in known balances of this type is in the form of a stylized beam balance (DE - OS No. 26 04 747) or of a clock (DE - OS No. 29 33 215) or of a container (DE - GM No. 84 15 737). However, these known constructions are expensive to manufacture, do not sufficiently attract the attention of the operator to the critical end of the loading (the control value and the 100% value of the analog display), and/or do not make an overfilling sufficiently clear.

SUMMARY OF THE INVENTION

This invention has the object of creating an electronic balance wherein both the digital display and the analog display, clearly indicate the progression of the manual loading of the balance to the set control weight or value. The analog display is a geometrically simple display which clearly indicates the loading approaching 100% of the control value and also indicates an overfilling in a clear and visible manner.

The invention accomplishes this object as follows: The electronic balance comprises a measured value receiver and an electronic evaluation unit, having both a digital and an analog display, whereby both displays are controlled by the electronic evaluation unit, and by a digital infeed keyboard. The keyboard is used for inputting the control value of a loading. The electronic evaluation unit contains a memory and an arithmetic unit which permit the values displayed in the digital and in the analog display to be differentiated against each other by the amount stored in the memory, so that during the loading process the digital display runs from the negative control value to zero (0 g) and the analog display from 0% to 100%. The analog display comprises adjacent bars which can be shifted in their lightness. The length of the individual bars decreases continuously from 0 to 100% and over 100% continuously increases again.

This construction of the electronic balance makes it possible to combine a readily understandable digital display, with a clear analog display. The operator need concentrate only on the digital final value 0 g and/or the analog final value 100% in all loading procedures, independently of the theoretical weight.

The bar length of the analog display, which continuously decreases from 0% to 100%, preferably in a linear fashion, creates a triangular triangle-like contour of the bars, so that at the final value of the loading, the 100% tip of the triangle, is easy to estimate. If the number of the displayed bars is selected so that the area of the triangle increases in proportion to the weight, the border area light/dark in the analog display moves faster and faster to the tip at a constant loading speed, "forcing" the operator to decrease the loading speed. If an overfilling should nevertheless occur, it is clearly indicated in the analog display by the second triangle above 100%. In the digital display the overfilling is indicated by the change of the sign from "minus" to "plus".

The switching of the lightness in the analog display can be accomplished by using an LCD display having a light background wherein the bars are darkened. An analog display with dark background is also possible wherein the switching of the lightness consists in lightening the bars (e.g. in fluorescent displays or screen displays).

The length of the individual bars of the analog display decreases from 0% to 100% in a preferably linear manner from an initial value to zero, so that a precise triangle results having a constant slope. This creates a very simple geometric form which points clearly to the tip, that is, the 100% point. The overflow area above 100% is then advantageously likewise formed as a triangle with the same slope.

The overflow area is advantageously displayed up to approximately 105% of the control value.

It is also advantageous if the control value of the set weight stored in the memory is displayed digitally in a display field above the 100% point of the analog display and an arrow from this display field to the 100% point is provided. This construction of the analog display reemphasizes the 100% point as the end of the loading procedure.

If a finer resolution of the analog display is desired, the bars can be formed out of individual, separately controllable points. The so formed bars provide a higher resolution for the analog display which can be achieved without the outer dimensions of the display becoming too large.

In a further advantageous embodiment another input key, and in the electronic evaluation unit, additional calculating and storage means can be provided, which permit the analog display to be reset to 0% at any time without affecting the digital display.

It is advantageous thereby if the additional calculating and storage means comprise a memory in which when the additional input key is actuated, the net value $N_{DT}$ (net weight at reset) present at this instant is stored. A subtraction unit subtracts the value $N_{DT}$ stored in the memory from set weight S (control weight value) and from net value N (present net weight), and a quotient formulation means which forms the quotient $$\frac{N - N_{DT}}{S - N_{DT}};$$

this quotient is then displayed in the analog display.

This creates in this embodiment the additional possibility of resetting the analog display during the loading to zero without affecting the digital display or the 100% point, that is, the control value of the loading. If, for example, 90% of the theoretical weight has already been added in and if then the analog display is reset to 0% by actuating the additional input key, the analog display reacts more sensitively by a factor of 10 during the remaining loading, which makes the precise loading to 100% easier.

For example if the set weight of control value is 100 g and 90 g have already been added the instantaneous net value $N_{DT}$ is 10 g when the analog display is reset. After 99 grams have been added the net value N would be 1 g resulting in a 10% quotient rather than a 1% reading if the display had not been reset.

In another preferred embodiment the electronic balance comprises additional setting means with which a tolerance limit x can be set. The bars of the analog display, which can be shifted in lightness, decrease continuously in length from 0% to (100−x)%, are equally long between (100−x)% and (100+x)% and become continuously longer again above (100+x)%. Here again, the continuous decrease and increase are preferably linear.

In this embodiment it is desirable that the operator obtains the additional information in the analog display as to whether the actual value of the current amount within the set tolerance limits coincides with the control value, this avoids a time-consuming loading to the exact control value.

It is advantageous in this embodiment if not only the value of the set weight is digitally displayed above tolerance range (100−x)% to (100+x)% of the analog display, but also the tolerance limits −x and +x. It is also advantageous to provide an arrow from the negative tolerance limit −x to point (100−x)% of the analog display and from the positive tolerance limit +x to point (100+x)% of the analog display.

BRIEF DESCRIPTION OF THE DRAWINGS

The invention is described in the following in preferred embodiments.

DETAILED DESCRIPTION OF THE INVENTION

Figure 1:
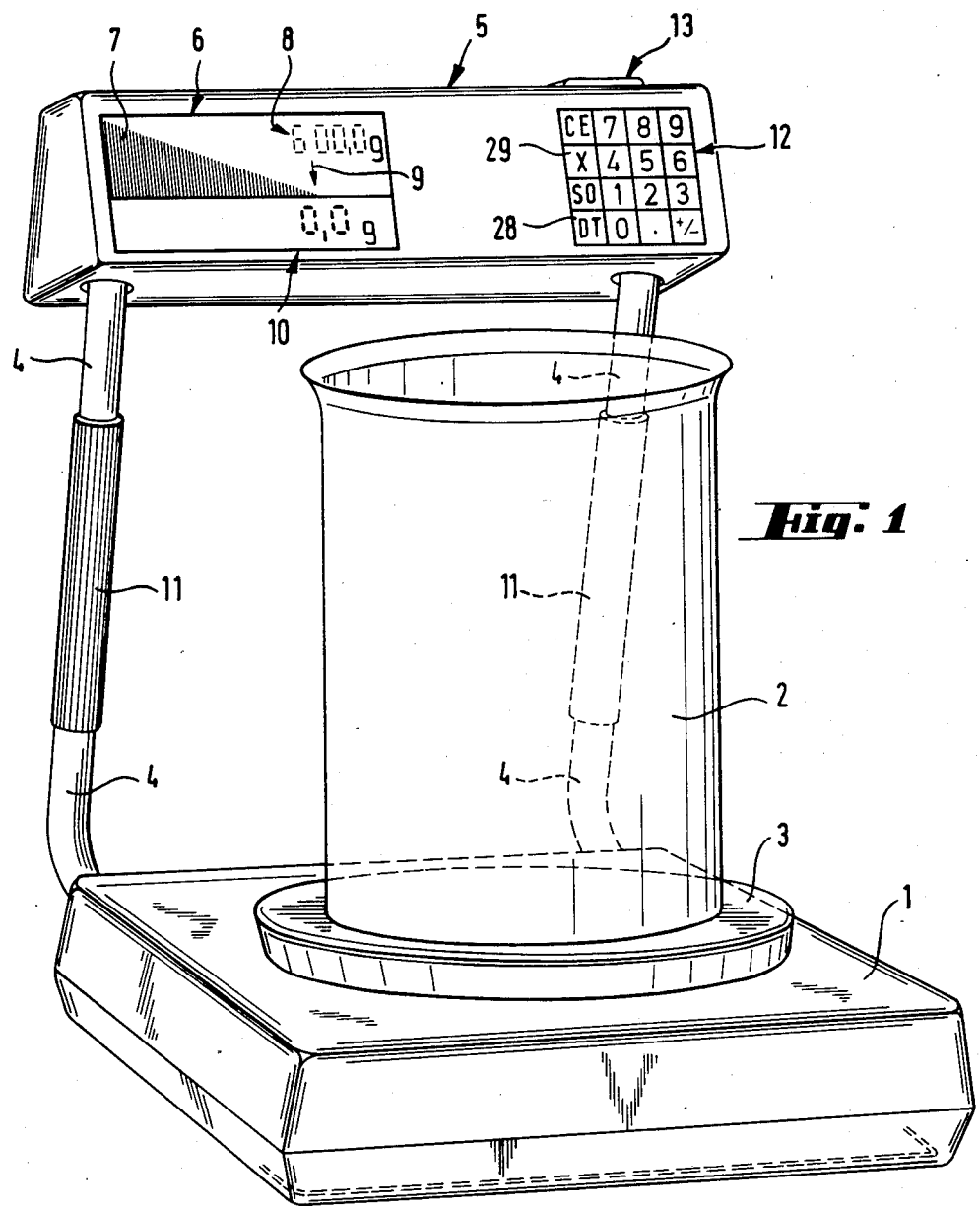
FIG. 1 shows an electronic balance for loading.

The electronic balance of FIG. 1 comprises lower housing 1 in which the measuring system is housed; balance scale 3 for receiving the material to be weighed, drawn here as glass beaker 2; and display/operating console 5 connected via supports 4 with hand grip 11 to lower housing 1 of the balance. Display/operating console 5 contains analog display 6 in the form of an LCD display, digital display 10, tare key 13 and keyboard 12 for inputting the theoretical weight and therewith the 100% value of the analog display. The analog display comprises adjacent dark bars 7 which form a filled-out triangle in FIG. 1. This signifies 100% and the tip of the triangle forms the 100% point. An empty field signifies 0%. As loading proceeds a long bar appears first on the left, than a second, a third, etc. (see FIG. 3) until the entire triangle has been filled out to the tip. Over 100% the bars become longer again and generate a second triangle (see FIG. 5). In addition, the preselected theoretical weight 8 is digitally displayed above the 100% point and arrow 9 points to the 100% point.

Figure 2:
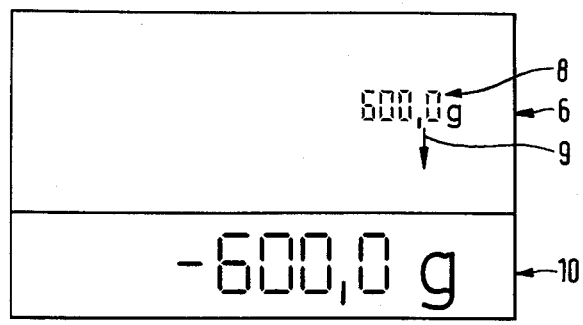
FIG. 2 shows the analog and the digital display at the start of the loading process.
Figure 3:
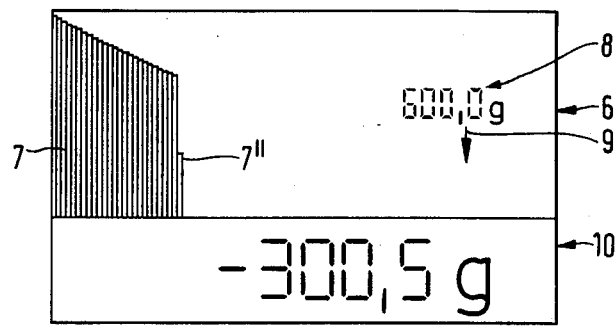
FIG. 3 shows the analog and the digital display with the loading process approximately half completed.

The course of a loading and the interplay of the analog and the digital display will now be explained with reference made to FIGS. 2 to 5. After the taring of the empty container by tare key 13, the theoretical weight is inputted first via keyboard 12 and stored in a memory of the digital evaluation unit by processing key "SO" of keyboard 12. Analog display 6 shows 0% (no bar dark), digital display 10 indicates the negative control value (600.0 g was selected as example) and the control value 600.0 g appears in additional display field 8 above the 100% point of the analog display (FIG. 2). During the loading which now follows, digital display 10 runs from the negative control value to 0 g and the analog display from 0% to 100%. The difference between the digital display and the analog display is always equal to the control value, assuming that the percent display of the analog display is converted back into grams. As an example thereof, the state after approximately a half completed loading is shown in FIG. 3, 299.5 g have already been filled in, digital display 10 indicates the still lacking amount of 300.5 g with a negative sign and analog display 6 indicates barely 50% in that enough bars 7 are darkened so that barely 50% of the triangle area is dark. The last bar 30 is darkened only partially in order to indicate that it is possible to darken not only entire bars but also parts of them, so that each bar increases point by point during loading.

Figure 4:
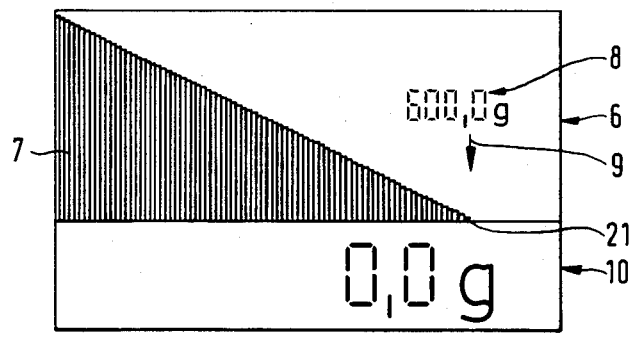
FIG. 4 shows the analog and the digital display at the end of the loading process.

FIG. 4 shows the end of the loading: Digital display 10 indicates 0 g and analog display 6 indicates 100% since all bars 7 have been darkened, so that the entire area of the triangle is dark up to the 100% point 21.

Figure 5:
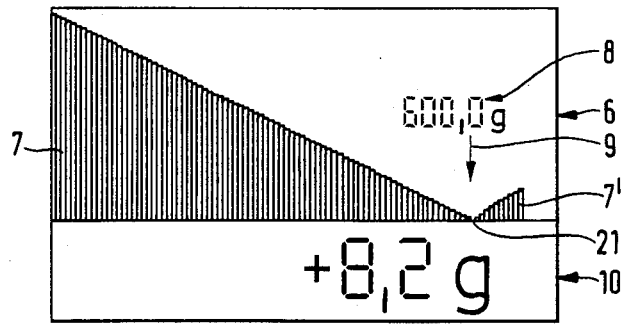
FIG. 5 shows the analog and the digital display at overfilling.

If the loading were to continue, as is assumed in FIG. 5, digital display 10 would indicate positive values and analog display 6 would go into the overflow area and construct a second triangle out of bars 7. The overfilling would thus be indicated both by the positive sign of the digital display and also by the start of a second area 7' in the analog display as well as by the advance of the dark bars past 100% point 21 designated by arrow 9.

Figure 6:
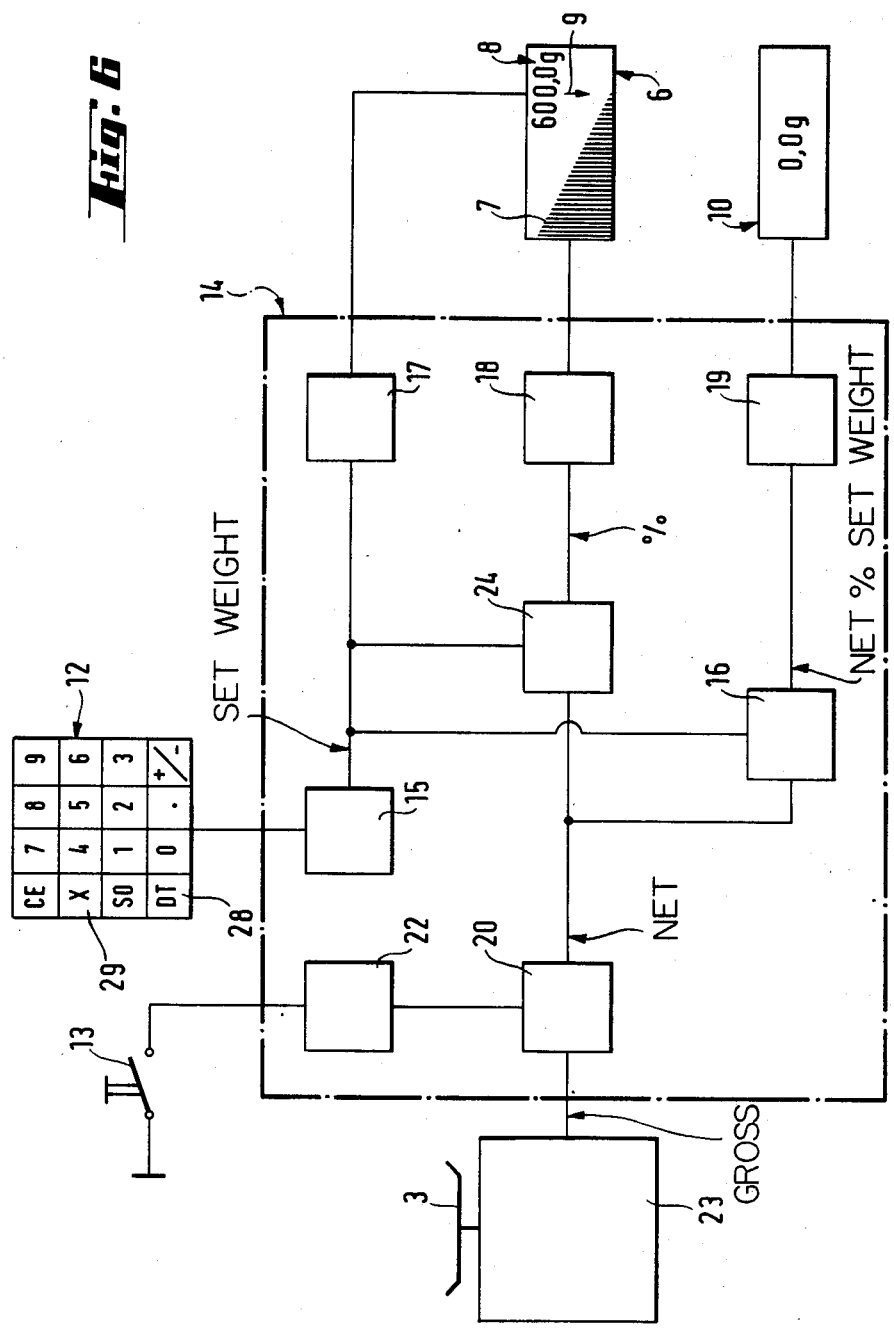
FIG. 6 shows a block diagram of the electronic balance.

FIG. 6 shows the block diagram of the electronic balance, especially with the display control means for the analog and the digital display. The balance mechanism is suggested only by balance scale 3 and the measured value receiver along with the possibly necessary analog-digital converter is also shown only in a schematic manner by box 23, since its method of operation is known and plays no part in the invention. The digital weighing signal passes into electronic evaluation unit 14, which can consist, for example, of a microprocessor. First, the value in tare memory 22 is subtracted from this gross weighing signal in subtraction device 20, whereby tare memory 22 can be loaded with the gross weighing signal present by actuating tare key 13. The control value for the loading inputted via keyboard 12 is filed in memory 15 and fed to display driver 17 for additional digital display 8. Further, quotient formulating means 24 forms the quotient from the current net value and the control value in memory 15 and passes the percent value via display converter 18 to analog display 6. Subtraction device 16 is also present, which reduces the current net value by the control value in memory 15 and feeds it via display driver 19 to digital display 10.

The data-processing functions just briefly described can of course be combined in an LSI module and programed like software. This can be easily accomplished by any electronics expert by referring to the described operating sequence and the block diagram in FIG. 6. Likewise, the details of the memory, the subtraction devices, the quotient formulation means, the display converter for the analog display and of the display driver for the digital displays were not explained individually, since they are generally known in the electronics art.

The control value of the loading can of course also be set by a higher-order computer of the eletronic evaluation unit instead of the manual input via the input keyboard.

Figure 7:
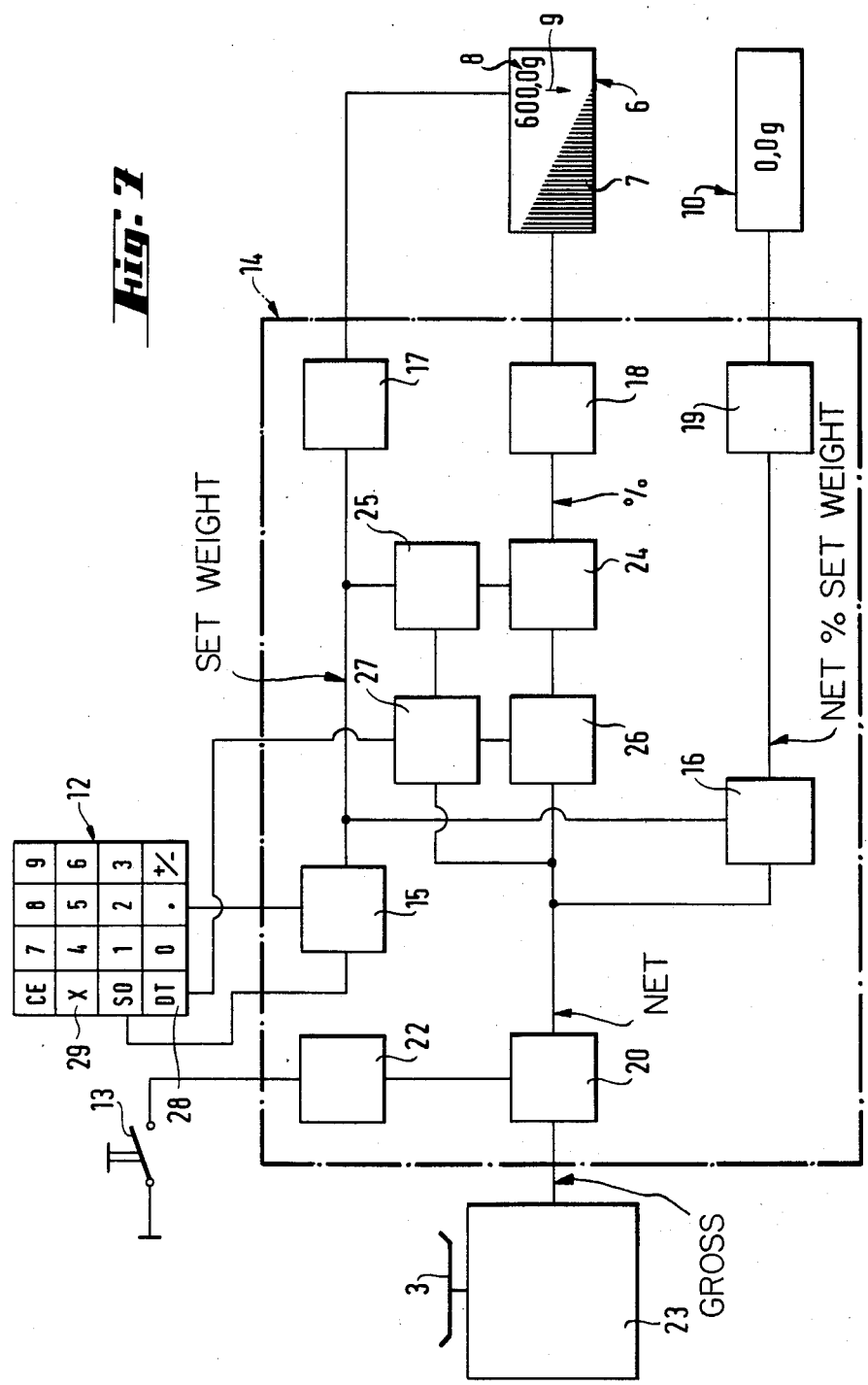
FIG. 7 shows a block diagram of the electronic balance in another embodiment.

FIG. 7 shows the block diagram of the electronic balance in another embodiment. The same functional components are designated by the same reference numbers as in FIG. 6. The embodiment of FIG. 7 comprises in addition to the functional components already described for FIG. 6 a memory 27 and two subtraction units 25 and 26. When key 28 "DT" is actuated during the loading process, this stores the net value $N_{DT}$ present at that instant into memory 27. This value $N_{DT}$ is then subtracted in subtraction unit 25 from control value S (from memory 15) and subtracted in subtraction unit 26 from net value N. Thus, quotient $$\frac{N - N_{DT}}{S - N_{DT}}$$

is formed in quotient formulation means 24 and transmitted via display converter 18 to analog display 6.

Figure 8:
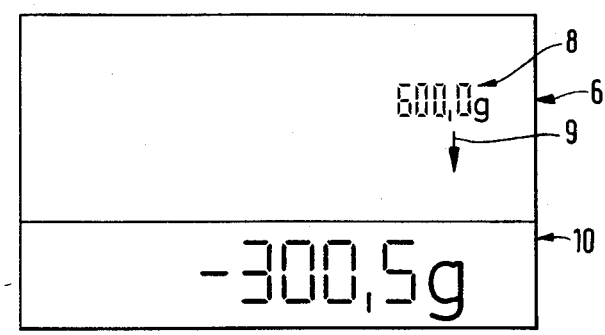
FIG. 8 shows the analog and the digital display with the loading process approximately half completed after resetting of the analog display in the embodiment of FIG. 7.

If, for example, key 28 is actuated after the loading of 299.5 g (state in the example of FIG. 3), the value 299.5 g for $N_{DT}$ is stored in memory 27. Since $N = N_{DT}$ at this instant, the quotient $$\frac{N - N_{DT}}{S - N_{DT}}$$

is zero and the analog display therefore shows 0%. Digital display 10 is not affected by this operation and therefore continues to indicate −300.5 g. This state is shown in FIG. 8.

If the loading continues, analog display 6 rises until the control value (N=S) at 100% is reached. The sensitivity of the analog display was therefore approximately doubled by setting at zero at approximately one-half the theoretical weight. The loading preciseness of the analog display is therewith correspondingly greater. In a corresponding manner the sensitivity of analog display 6 can be increased by a factor of 10 by actuating key 28, e.g. after loading 90% of the theoretical weight or by a factor of 50 by actuating it e.g. after loading 98% of the theoretical weight. Limit values can of course be set in digital evaluation unit 14 in FIG. 7 which block key 28, e.g. above 99% of the theoretical weight in order to prevent an illogical increase of the resolution of the analog display over the resolution of the digital display. For example, key 28 could bring about the increase in sensitivity of the analog display just described up to 99% of the theoretical weight while it brings about the end of the loading (e.g. expression of the actual loaded value) above 99% of the theoretical weight.

If key 28 is not actuated, the number 0 is stored in memory 27, and the embodiment of FIG. 7 then operates therefore precisely as the embodiment of FIG. 6.

Figure 9:
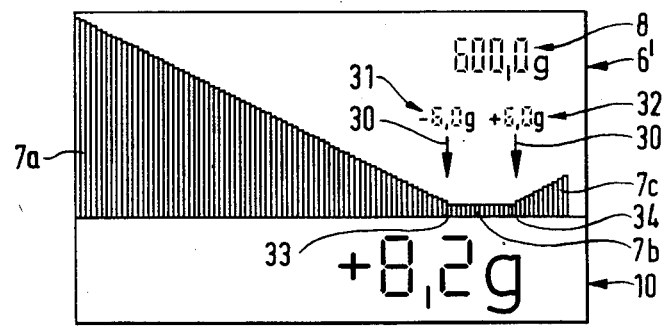
FIG. 9 shows the analog and the digital display in another embodiment with indication of the tolerance limit.

FIG. 9 shows another embodiment 6' of the analog display. In this embodiment an additional tolerance limit x is selected and the length of the display bars decreases linearly only to (100−x)% (point 33). The tip of triangle 7a is therefore lacking. Instead of it, area 7b with a constant bar length is present between points 33 and 34. Past point 34 the bar length increases linearly again and generates a second triangle 7c. The two triangles 7a and 7c are arranged so that they would have a common tip at the 100% point in the middle between points 33 and 34. During loading, triangle 7a is again darkened bar by bar, then area 7b with constant bar length and finally, in the case of an overloading, triangle 7c too. Point 33 corresponds to the lower tolerance limit (100−x)% and point 34 to the upper tolerance limit (100+x)%. Furthermore, theoretical weight 8 is digitally indicated above the 100% point and the tolerance with the appropriate signs 31, 32 is indicated above the tolerance limits 33 and 34. Two arrows 30 point to the lower and the upper tolerance limit.

The embodiments of the analog display given are of course only examples of the basic concept, namely, graduating adjacent bars in their length so that they become the shorter toward the 100% point, thus forming a triangle-like figure with their outer contour which runs to a tip as it approaches the 100% point or turns into a narrow band which characterizes the admissible tolerance range.

Other embodiments are of course also possible. Thus, for example, additional information can be displayed such as, e.g., the number of the component or a short form of the type of the component (e.g. "HCl" or "red" in color mixtures).

We claim:

1. Electronic balance comprising a measured value receiver and an electronic evaluation unit having a digital and an analog display, whereby both displays are controlled by the electronic evaluation unit, a digital input means is used for inputting a set weight for a loading procedure, the balance is characterized in that the electronic evaluation unit (14) contains a memory (15) for storing the set weight of the loading and an arithmetic unit (16) permits the values displayed in the digital display (10) and in the analog display (6) to be differentiated against each other by the amount stored in the memory (15), so that during the loading procedure the digital display runs from a negative set weight to zero and the analog display runs from 0% to 100% of the set weight, the analog display (6, 6') comprises adjacent bars (7, 7', 7a, 7b, 7c) which can be shifted in their lightness, whereby the length of the individual bars decreases continuously from 0% towards a 100% point and over 100% increases continuously again.

2. Electronic balance according to claim 1, characterized in that the length of the bars of the analog display decreases linearly with a fixed slope from 0% to 100% from an initial length to zero and increases again over 100% with the same slope.

3. Electronic balance according to claim 1 or 2, characterized in that the digital display displays overloading of the set weight to approximately 105% of the set weight.

4. Electronic balance according to claim 3, characterized in that the value of the set weight stored in the memory (15) is digitally displayed in a display field (8)

above the 100% point (21) of the analog display and that an arrow (9) from the display field pointing to the 100% point is provided.

5. Electronic balance according to claim 4, characterized in that the analog display (6, 6') is formed from an LCD display.

6. Electronic balance according to claim 1, characterized in that the bars (7, 7', 7a, 7b, 7c) are formed by individual, separately controllable points.

7. Electronic balance according to claim 1, characterized in that an additional input key (28) is present and that additional calculating and storage means (24, 25, 26, 27) are present in the electronic evaluation unit (14) which permit the analog display (6) to be reset to 0% at any time without affecting the digital display (10).

8. Electronic balance according to claim 7, characterized in that the additional calculating and storage means (24, 25, 26, 27) comprise a memory (27) in which when the additional input key (28) is actuated, the net weight value $N_{DT}$ present at this instant is stored, that the calculation and storage means also comprise a substraction means which subtract the value $N_{DT}$ stored in the memory (27) from set weight S and from a present net weight value N, that the calculation and storage means also comprises a quotient formulation means (24) which forms the quotient $$\frac{N - N_{DT}}{S - N_{DT}}$$

and that this quotient $$\frac{N - N_{DT}}{S - N_{DT}}$$

is displayed in the analog display (6).

9. Electronic balance according to claim 1, characterized in that additional input means (12, 29) are present with which tolerance limits (x) can be set and that the analog display (6') consists of adjacent bars (7a, 7b, 7c) which can be shifted in their lightness, whereby the length of the individual bars decreases continuously from 0% to (100−x)%, are of constant length between (100−x)% and (100+x)% and increase in length again continuously over (100+x)%.

10. Electronic balance according to claim 9, characterized in that the length of the bars of the analog display (6') decreases linearly with a constant scope from 0% to (100−x)% from an initial value to a smaller final value, is constant between (100−x)% and (100+x)% increases again with the same slope over (100+x)%.

11. Electronic balance according to claim 9, characterized in that in the analog display, tolerance limits −x and +x are digitally indicated above tolerance range (100−x)% to (100+x)%, and that an arrow (30) is provided from negative tolerance limit −x (31) to a negative tolerance point (100−x)% of the analog display and from positive tolerance limit +x (32) to a positive tolerance point (100+x)% of the analog display.

* * * * *